(12) United States Patent
Jacobsen

(10) Patent No.: US 6,860,114 B2
(45) Date of Patent: Mar. 1, 2005

(54) COOLING UNIT AND CONTAINER WITH THIS UNIT

(75) Inventor: Henrik Jacobsen, Graasteen (DK)

(73) Assignee: Maersk Container Industri A/S, Tinglev (DK)

(*) Notice: Subject to any disclaimer, the term of this patent is extended or adjusted under 35 U.S.C. 154(b) by 0 days.

(21) Appl. No.: 10/681,485

(22) Filed: Oct. 7, 2003

(65) Prior Publication Data

US 2004/0065100 A1 Apr. 8, 2004

Related U.S. Application Data

(63) Continuation of application No. PCT/EP01/05277, filed on May 9, 2001.

(51) Int. Cl.[7] .................... F25B 41/00; F25B 49/00; F25B 1/00
(52) U.S. Cl. ............... 62/196.4; 62/228.4; 62/228.5; 62/510
(58) Field of Search ............... 62/196.4, 197, 62/228.5, 228.4, 513, 113, 510

(56) References Cited

U.S. PATENT DOCUMENTS

| | | |
|---|---|---|
| 4,726,196 A | 2/1988 | Zajic |
| 4,787,211 A | 11/1988 | Shaw |
| 5,157,933 A * | 10/1992 | Brendel ............ 62/196.4 |
| 6,223,546 B1 | 5/2001 | Chopko et al. |
| 6,530,238 B2 * | 3/2003 | Hansen ............ 62/228.4 |

FOREIGN PATENT DOCUMENTS

| | | |
|---|---|---|
| EP | 0 718 568 | 6/1996 |
| EP | 1 099 918 | 5/2001 |
| WO | WO 95/22729 | 8/1995 |

* cited by examiner

Primary Examiner—Marc Norman
(74) Attorney, Agent, or Firm—Barry R. Lipsitz; Douglas M. McAllister

(57) ABSTRACT

To provide a transportable cooling unit for maintaining a transport volume at a defined temperature, comprising a closed cooling circuit and a controller sensing a temperature present within said transport volume and controlling said cooling circuit so as to provide the cooling power demanded at said evaporator for maintaining said defined temperature and minimizing energy consumption, said controller operates said closed cooling circuit between a maximum possible heating power and a maximum possible cooling power in a sequence of different operational stages, said controller further operates said closed cooling circuit in each one of at least two upper operational cooling stages at a compressor speed related cooling capacity different from said compressor speed related cooling capacity in said other upper operational stages and within said respective upper operational stages said controller operates a compressor in an uninterrupted mode and adjusts said cooling power stepless speed control of said compressor.

32 Claims, 5 Drawing Sheets

COOLING UNIT AND CONTAINER WITH THIS UNIT

The present disclosure relates to the subject matter disclosed in international application No. PCT/EP01/05277 of May 9, 2001, which is incorporated herein by reference in its entirety and for all purposes.

BACKGROUND OF THE INVENTION

The invention relates to a transportable cooling unit for maintaining a transport volume at the defined temperature, comprising a closed cooling circuit serially including a multi-stage compressor, a condenser, an expansion device and an evaporator arranged in said transport volume as well as a speed-controlled electric motor driving said compressor.

Such transportable cooling units are, for example, disclosed in the article of R. D. Heap "Refrigerated containers in . . . ".

The object of the present invention is to provide a transportable unit cooling which provides minimized energy consumption in combination with optimized temperature stability within the transport volume irrespective of the environment.

SUMMARY OF THE INVENTION

This object is achieved by a transportable cooling unit for maintaining a transport volume at a defined temperature, comprising a closed cooling circuit serially including a multi-stage compressor, a condenser, an expansion device and an evaporator arranged in said transport volume, a speed-controlled electric motor driving said compressor and a controller sensing a temperature present within said transport volume and controlling said electric motor so as to provide the heating or cooling power demanded at said evaporator for maintaining said defined temperature and minimize energy consumption, said controller operating said closed cooling circuit between a maximum possible heating power and a maximum possible cooling power in a sequence of different operational stages comprising a lowest operational stage and a sequence of at least two upper operational cooling stages, said controller operating said closed cooling circuit in each one of said upper operational cooling stages at a compressor speed related cooling capacity different from said compressor speed related cooling capacity in said other upper operational cooling stages and within said respective upper operational cooling stages in an uninterrupted mode and adjusting said cooling power provided by said closed cooling circuit by an essentially stepless speed control of said electric motor.

The advantage of the present invention is to be seen in the fact that due to the sequence of different operational stages the compressor can be run within a reasonable speed range which is advantageous for an optimized compressor design and optimized compressor energy consumption but within the speed range different levels of cooling power can be achieved by using different operational stages of the closed cooling circuit, which makes it possible to minimize energy consumption of the entire system.

According to the present invention control of the speed of the electric motor could be achieved by various means. It turned out to be advantageous for the speed controllable electric motor to be a frequency controlled AC-motor, because in such a frequency controlled AC-motor the energy consumption can be reduced in accordance with the speed of the controllable electric motor.

In the various advantageous embodiments of the present invention it is not defined how it is possible to obtain heating power in addition to cooling power in the said closed cooling circuit.

For instance it would be possible to provide specific heat transformers or heaters.

One advantageous embodiment uses the closed cooling circuit to obtain heating power. In particular in said closed circuit heating power is obtained in addition to cooling power by providing an inoperable mode for said condenser in addition to an operable mode for said condenser. In said inoperable mode of said condenser the refrigerant heated by said compressor is not cooled so that the heated refrigerant arrives at the evaporator at high temperature and cannot evaporate anymore so that the evaporator finally is heated and consequently heating power can be obtained at the evaporator.

It is particular of advantage if said inoperable mode of said condenser provides bypassing of said condenser.

Since according to standard operation of the closed cooling circuit the refrigerant after said condenser passes through that expansion device it is particularly advantageous if said inoperable mode of said condenser provides bypassing of said expansion device.

Such bypassing of said condenser can easily be realized by a bypass pipe and a valve which enables changes between the operable mode of said condenser combined with an inoperable bypass pipe and the inoperable mode of said condenser combined with an operable bypass pipe.

This changes can be changes between the two aforementioned two alternatives by a switching valve all these changes can be continuous changes from one of the aforementioned modes to the other aforementioned mode.

In accordance with the aforementioned embodiments of the present invention it is not defined how the controller operates the compressor in said lowest operational stage. It is particularly advantageous if in said lowest operational stage said controller operates said compressor in an uninterrupted mode at low speed and operates said closed cooling circuit by changing between the operable and inoperable mode of said condenser according to respective mode intervals adjusts said cooling or heating capacity by adjusting at least one of the parameters comprising speed of said compressor and duration of said mode intervals.

The advantage of this embodiment of the present invention is that in the low operational stage it is allowed to run the compressor so as to be able to control low cooling power of the closed cooling circuit and to maintain the energy consumption dependent on the demanded cooling capacity but to maintain a certain level of speed if the compressor is operable for maintaining a reasonable level of compressor efficiency.

It is particularly advantageous if the controller in said low operational stage maintains said speed of said compressor essentially constant and varies the duration of said mode intervals, for example the intervals within which the valve is switched on or off so that the cooling power is only controlled by controlling the valve interruption intervals.

In such an embodiment it is of particular advantage if in said lowest operational mode said speed of said compressor is in the dimension of the minimum possible speed for the compressor. This means that the compressor is run at the lowest allowable speed for proper operation and that if only cooling power is needed which is lower than the cooling or heating power provided at that minimum speed a further reduction is performed by operating the mode intervals.

With the various embodiments explained before the bypassing of the condenser and eventually the expansion device has not been explained in detail except that advantageously a bypass pipe and the valve are provided.

A particular advantageous embodiment provides a bypass bypassing said condenser and that expansion device and a valve arranged in said bypass pipe. This is a very simple and advantageous embodiment and opening and closing the valve in the bypass pipe is sufficient for a bypassing said condenser and said expansion device because the design of the expansion device, in particular the pressure drop provided therein makes it not necessary to provide separate means for blocking the stream of refrigerant through said condenser and said expansion device.

The valve provided in said bypass pipe can be a valve which has only two positions one closing said bypass pipe and one opening said bypass pipe.

In such a case the bypass pipe can be closed and opened according to said operable or said inoperable mode of said condenser desired.

However, it is also possible to provide a valve which enables continuous regulation of the flow through the bypass pipe so that the flow through the bypass pipe can be adjusted continuously and consequently the operation of the condenser can be continuously changed between the fully operable mode and the fully inoperable mode so that for example the condenser can be operated in a partially operable mode combined with a partially operable bypass line.

In connection with the aforementioned explanations of various embodiments of the present invention it has not been defined how the controller determines the cooling power demanded.

A more advantageous manner of determining the cooling power demanded is to compare the temperature present within that transport volume and the requested temperature in said transport volume.

With respect to the temperature detection within the transport volume the location of detection has not been defined in connection with the explanation of the aforementioned embodiments.

Generally, the temperature within the transport volume can be detected anywhere therein.

For obtaining a fast response of the temperature detection it is advantageous if the controller senses the temperature in a stream of air circulating within said transport volume because in such a case the controller obtains the proper temperature values with a short response time.

In addition, it is advantageous to sense the temperature within said transport volume close to said evaporator because in this case the cooling power demanded can be determined more precise.

In general, the controller could start in the uppermost operational stage or in the lowermost operational stage and follow the sequence of operational stages until the desired temperature is obtained.

To be able to respond precisely to temperature changes it is of advantage if the controller selects the currently necessary operational stage in accordance with the cooling power demanded.

In accordance with the present invention, as discussed above, it would be possible to have a varying compressor speed related cooling capacity of said closed cooling circuit within at least one of said upper operational stages, however, for designing an easily controllable system it is of advantage if said compressor speed related cooling capacity of said closed cooling circuit with the condenser being in the operable mode is constant within at least one of said upper operational stages.

With respect to a cost effective design of the inventive cooling unit it turned out to be advantageous for said compressor speed related cooling capacity of said closed cooling circuit in said lowest operational stage with the condenser being in said operable mode to be the same as the compressor speed related cooling capacity in said one of said upper operational cooling stages covering the lowest range of cooling power of said sequence of upper operational cooling stages.

If the controller has the possibility to switch from one upper operational cooling stage to another upper operational cooling stage such a switching is advantageously defined by a respective cooling power. To avoid at this respective cooling power a fast switching back and forth between one upper operational cooling stage and the other operational cooling stage it is advantageous if the controller switches from one upper operational stage to another upper operational stage with a hysteresis with respect to the level of cooling power, which means that the cooling power at which the controller switches from one upper operational cooling stage to the next higher operational cooling stage is higher than the cooling power at which the controller switches from the higher operational stage to the next lower upper operational cooling stage.

In the course of such a switching from one operational stage to the next operational stage the cooling power provided by the closed cooling circuit could come out of control.

This is avoided if in the course of a transition from one of said upper operational cooling stages to another of said upper operational cooling stages said controller maintains full control of the cooling power provided by said closed cooling circuit by adjusting the speed of said compressor in accordance with a change of the compressor speed related cooling capacity.

This means that even in the course of a transition from one operational cooling stage to the next operational cooling stage, which has the consequence that the corresponding compressor speed related cooling capacity changes, precise control of the cooling power provided is still maintained due to the fact that the controller even in the course of such a transition is still able to adjust the cooling power by adjusting the speed of the compressor.

An advantageous embodiment of the present invention provides a compressor designed as a multi-stage compressor which is operable in a first mode using a reduced number of compressor stages and in a second mode using all compressor stages of said compressor for compressing refrigerant. Such a design has the advantage that when operating the compressor at a reduced number of compressor stages the compressor speed related cooling capacity can be reduced and in addition the energy consumption is reduced due to the lower amount of energy which is needed for operating such a multi-stage compressor in a reduced number of compressor stages.

It is of particular advantage if such a multi-stage compressor is controllable by said controller of said closed cooling circuit so as to operate in said first mode or said second mode.

It is of particular advantage according to the present invention if in one of said upper operational stages said compressor operates in said first mode and in another of said upper operational stages said compressor operates in said second mode because then different operational stages can be defined by operating the compressor in different modes, e.g. a first and a second mode, and the controller can be used to switch the compressor between said first mode and said second mode.

In an embodiment of particular advantage it is provided that said controller changes from an operational stage in which the compressor operates in said first mode to the operational stage in which the compressor operates in said second mode at a defined level of cooling power which is higher then the defined level of cooling power at which the controller switches from the operational stage in which the compressor operates in said second mode to the operational stage in which the compressor operates in said first mode. Such a hysteresis used for changing between two operational stages is advantageous insofar as it prevents the controller at a certain level of cooling power from switching back and forth between the operational stages and therefore providing an unstable controlling characteristic which in particular has the consequence that the tolerances with respect to the defined temperature within the transport volume increase.

In another advantageous embodiment according to the present invention an economizer is provided in said closed cooling circuit.

Such a economizer could be designed to be fully operable within the entire operational range of the cooling unit.

However, it is of particular advantage if said economizer can be switched by said controller between an economizer off-mode and an economizer on-mode.

For providing different compressor speed related cooling capacities it is of particular advantage if in at least one of said upper operational stages the closed cooling circuit is controlled to operate in an economizer off-mode or in an economizer on-mode.

Such an embodiment of the present invention has the advantage that within the same range of speed of the compressor, different compressor speed related cooling capacities can be obtained and these different compressor speed related cooling capacities also result in a different energy consumption by the compressor, because in the economizer mode the energy consumption of the compressor is decreased with respect to the economizer off-mode.

To avoid compressor overheating the controller can start using the economizer function. This ensures higher cooling capacity at same compressor speed and reduces compressor temperature by injecting refrigerant to the compressor via the economizer.

One particular advantageous embodiment provides that said controller in said operational stage in which the closed cooling circuit can be operated in the economizer off-mode ir in the economizer on-mode switches from the economizer off-mode to the economizer on-mode if the temperature of the compressor exceeds a defined level.

In connection with the preferred embodiment explained before the only operational stage defined in which heating power could be provided was the lowest operational stage.

To obtain more heating power at the evaporator an advantageous embodiment provides an upper operational heating stage wherein said controller is operating said electric motor in an uninterrupted mode and adjusting said heating power provided by said closed cooling circuit by an essentially stepless speed control of said electric motor. Therefore, this upper operational heating stage provides the possibility to provide more heating power by a stepless speed control of said electric motor.

It is in particular of advantage if said compressor speed related heating capacity of said closed cooling circuit with said condenser being in its inoperable mode is constant within said upper operational heating stage.

To generate even more heating power a further advantageous embodiments provides a further operational heating stage in which the heating power of said cooling circuit is increased by a heating device. Such a heating device can be a heating device arranged for example in said bypass pipe but can also be a heating device arranged separately and closed to said evaporator where the heating power is needed.

The aforementioned object is further achieved by a refrigerated container comprising a thermally insulated housing enclosing a transport volume to be cooled, a cooling unit for cooling air circulating in said transport cooling volume, wherein said cooling unit is designed according to the features of the various embodiments as explained before.

Further advantages of the present invention are the subject matter of the detailed description of one embodiment of the present invention.

DETAILED DESCRIPTION OF THE INVENTION

Figure 1:
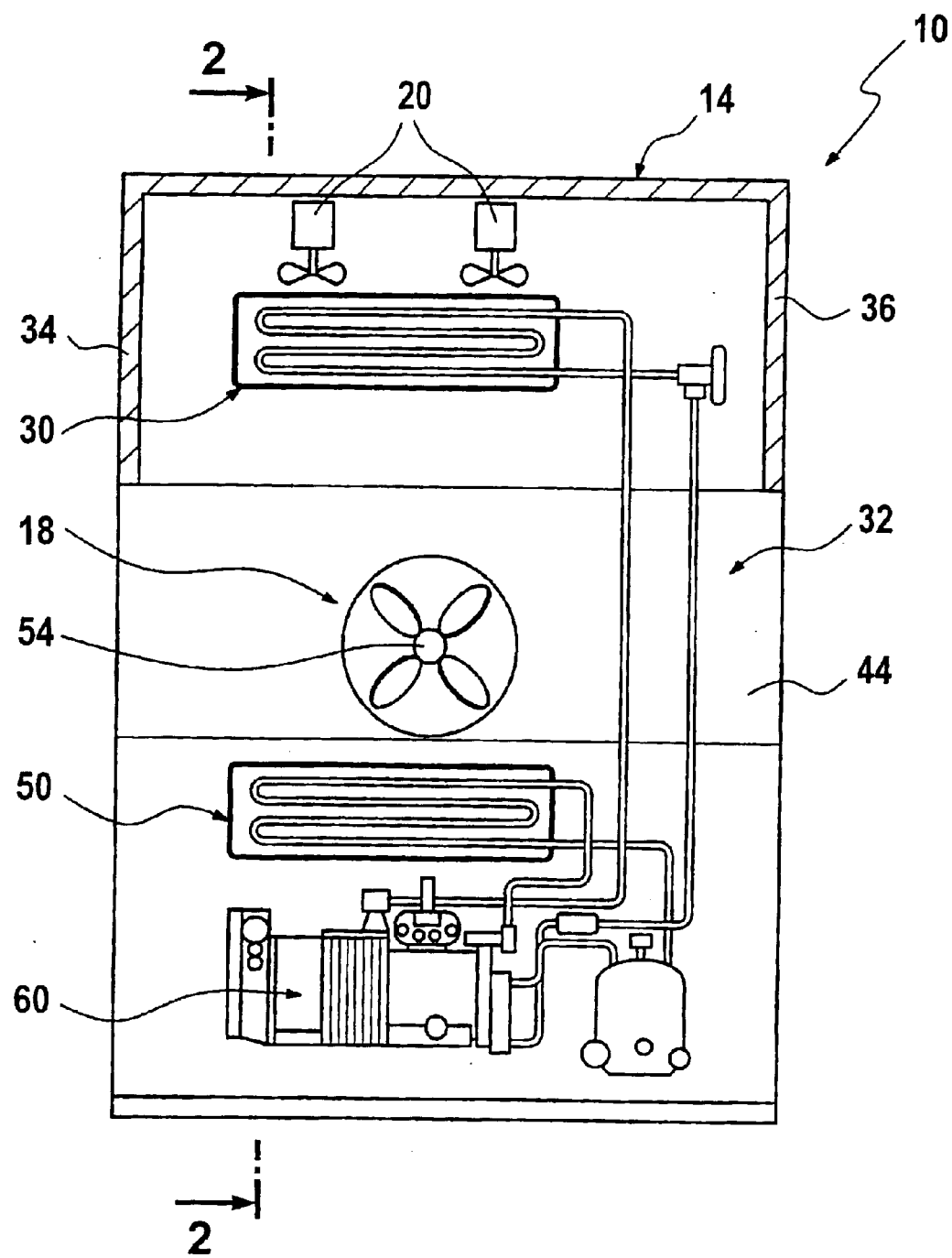
FIG. 1 shows a sectional view along lines 1—1 in FIG. 2 of a container provided with one embodiment of the present invention.
Figure 2:
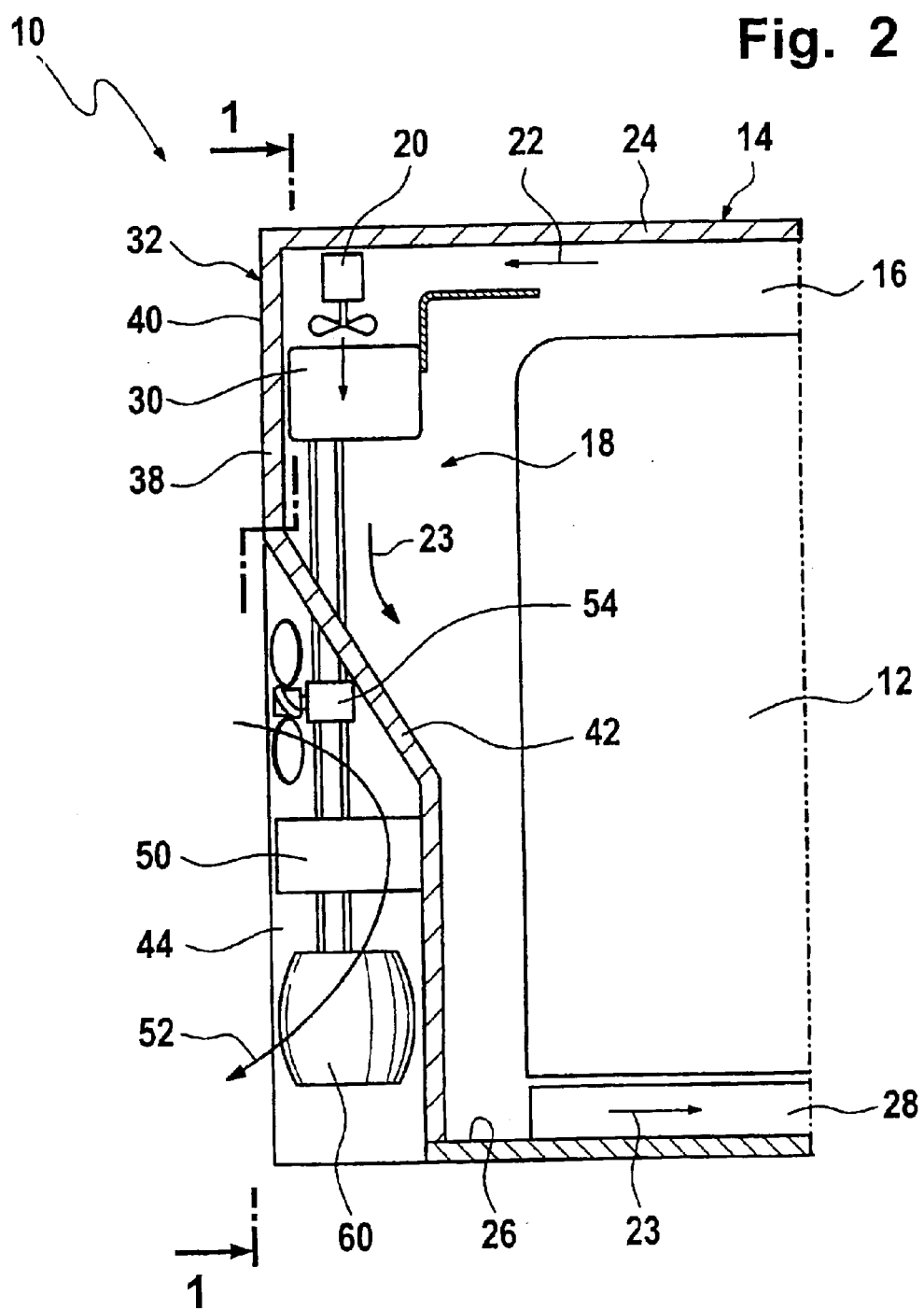
FIG. 2 shows a sectional view along lines 2—2 in FIG. 1.

A refrigerated container 10 designed for the transport of perishable cargos 12, such as, for example, frozen fish, chilled meat, fruit or chocolate or flower bulbs comprises a thermally insulated container housing 14 enclosing a transport volume 16 which is cooled by cooling unit 18.

Within the insulated housing air is circulated by an evaporator fan 20 receiving a return air stream 22 extending along a cover 24 of housing 14 and blowing this return air stream 22 through an evaporator 30 so that the stream of air is cooled and thereafter blown towards a bottom 26 of housing 14 as a supply air stream 23 and extending along bottom 26 between T-bars 28 of a T-bar floor of housing 14.

Preferably, evaporator fan 20 and evaporator 30 are arranged at a front portion 32 of housing 14.

Preferably, the evaporator 30 extends over a major portion of the width of front portion 32 between side walls 34 and 36 of housing 14.

Preferably, a front wall 38 of front portion 32 extends downwardly from cover 24 along a front end 40 of housing 14 and below evaporator 30 a portion 42 of front wall 38 steps back from front end 40 to form a space 44 between front end 40 and portion 42 of front wall 38 which is separated from transport volume 16 by portion 42 and in which a condenser 50 and a compressor 60 are arranged. Space 44 can be penetrated by a stream 52 of ambient air extending through condenser 50 and around compressor 60 for cooling of condenser 50 and compressor 60, said stream 52 of ambient air being blown through space 44 by a condenser fan 54.

Figure 3:
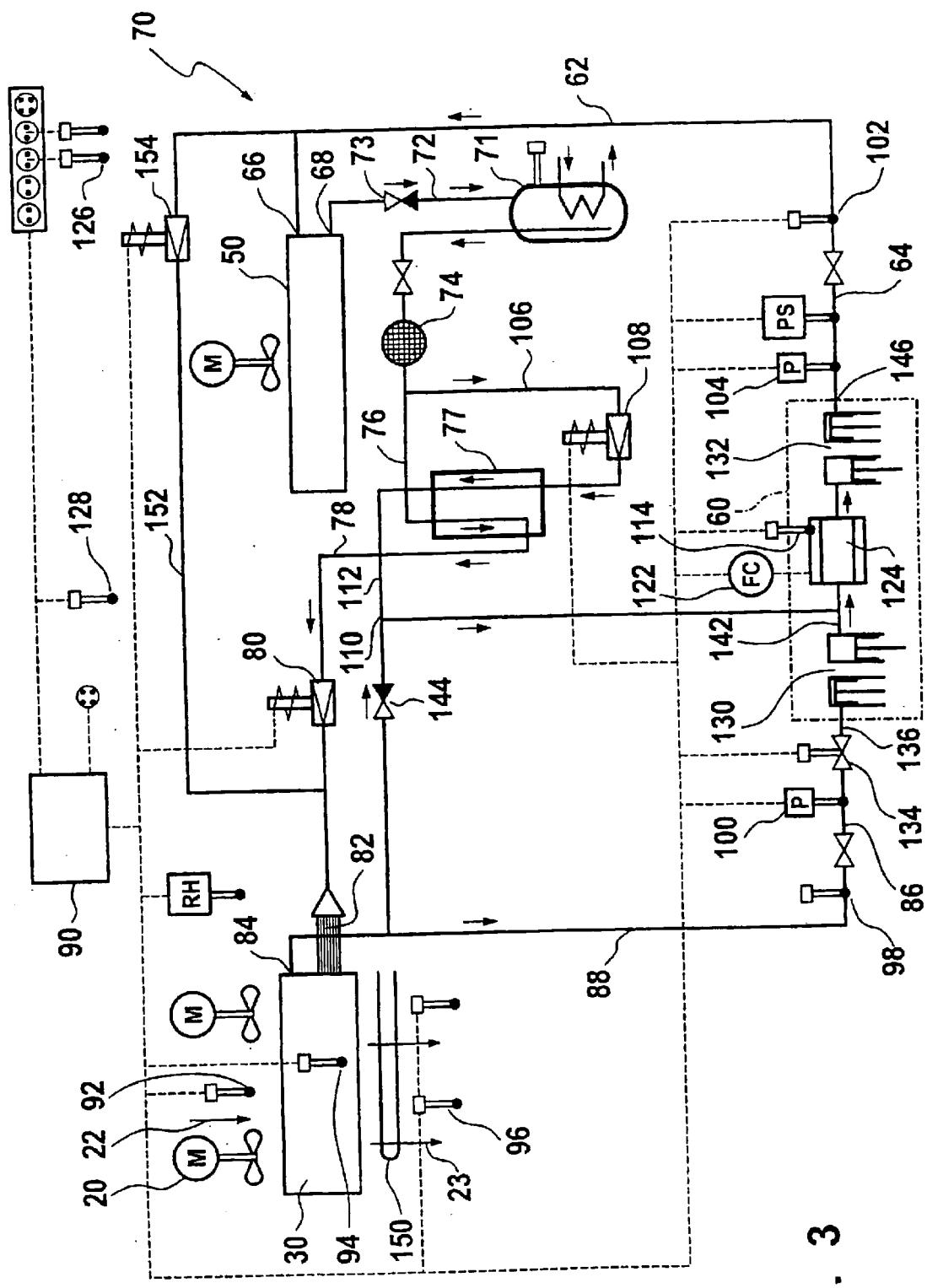
FIG. 3 shows a scheme of the various components of the cooling unit according to the present invention.

Evaporator 30, condenser 50 and compressor 60 are part of a closed cooling circuit 70 shown in detail in FIG. 3.

As can be seen in FIG. 3 compressor 60 receiving evaporated refrigerant compresses this refrigerant and discharges it into discharge pipe 62 extending between compressor discharge port 64 and an inlet port 66 of condenser 50.

The refrigerant after having passed through condenser 50 leaves through an outlet port 68 and is fed to a water cooled condenser 71 by pipe 72 in which check valve 73 is arranged. After having passed through a water cooled condenser 71 condensed refrigerant passes a drying filter 74 arranged in pipe 76 guiding condensed refrigerant to economizer 77. After having passed through economizer 77 condensed refrigerant is passed via feed pipe 78 to electronic thermo valve 80 which is the expansion device and from electronic thermo valve 80 to an inlet port 82 of evaporator 30 and after being evaporated within evaporator 30 to outlet port 84 which is connected to a compressor inlet 86 by suction pipe 88.

Closed cooling circuit 70 is controlled by a controller 90 which is connected to a temperature sensor 92 detecting the temperature of return air stream 22 before entering into evaporator 30. Controller 90 is further connected to temperature sensor 94 detecting the temperature within evaporator 30 and further connected to temperature sensors 96 provided for detecting the temperature of supply air stream 23 coming from evaporator 30 and being guided back into transport volume 16 for cooling cargo 12.

Controller 90 is further connected to temperature sensor 98 provided in suction line 88 for detecting a suction temperature of compressor 60.

Controller 90 further controls the pressure within suction line 88 by pressure transducer 100.

In addition, condenser 50 is provided with temperature sensor 102 which is also connected to controller 90.

Controller 90 further controls the pressure within condenser 50 by pressure transducer 104.

Economizer 77 is cooled by condensed refrigerant branched off from pipe 76 by pipe 106 and fed to electronic thermo valve 108 controlling the amount of refrigerant flowing to economizer 77. After having passed economizer 77 the amount of refrigerant is guided to an intermediate pressure inlet 110 of compressor 60 by pipe 112.

Controller 90 further controls electronic thermo valve 108 by the temperature of compressor 60 detected by temperature sensor 114.

Controller 90 further controls frequency controller 122 which controls the speed of a motor 124 driving compressor 60.

Controller 90 is further connected to cargo temperature sensors 126 for detecting the temperature of the cargo and to ambient temperature sensor 128 for detecting the temperature of the ambient air used for a cooling condenser 50.

Controller 90 further controls evaporator fans 20 and condenser fan 54.

Figure 4:
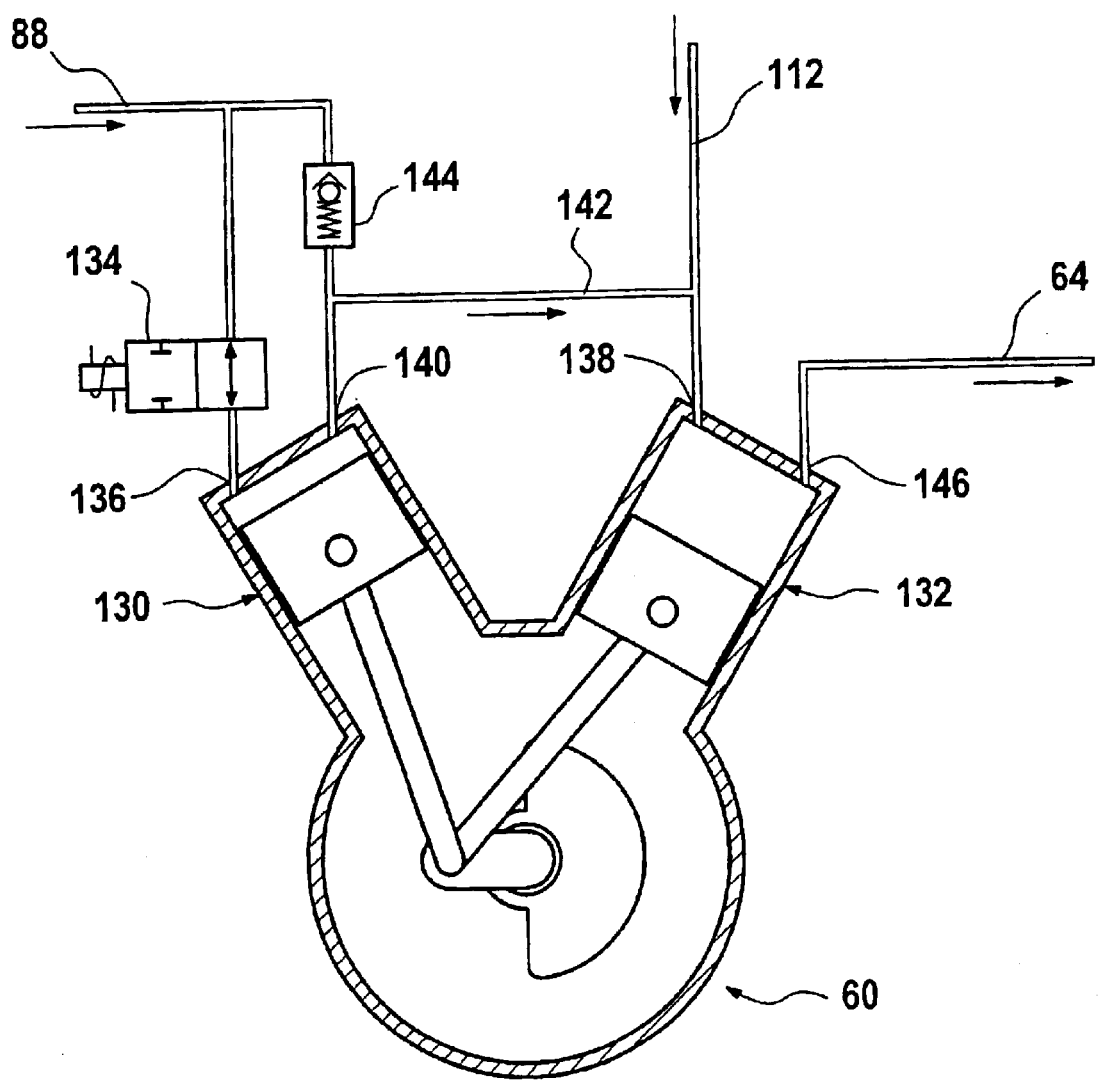
FIG. 4 shows details of the compressor on an enlarged scale.

As shown in FIG. 4 compressor 60 is a two stage compressor having, for example, two cylinders forming a first, low pressure stage 130 and two cylinders forming a second high pressure stage 132.

First stage 130 can be switched off by a solenoid valve 134 being able to close a low pressure inlet 136 of first stage 130 which is connected to compressor inlet 86.

As shown in FIG. 4 an intermediate pressure inlet 138 of second stage 132 and an intermediate pressure outlet 140 of first stage 130 are internally connected by an internal duct 142 arranged within compressor 60 and this internal duct 142 is connected to suction pipe 88 via check valve 144 for enabling a connection of suction line 88 and intermediate pressure inlet 138 of second stage 132.

As long as solenoid valve 134 keeps low pressure inlet 136 open, first stage 130 generates an intermediate pressure within intermediate pressure duct 142 which is above the pressure at low pressure inlet 136 and consequently the pressure within suction line 88. In this case, check valve 144 closes so that all refrigerant from suction pipe 88 enters low pressure inlet 136 of first stage 130.

If, however, solenoid valve 134 closes low pressure inlet 136 the pressure within intermediate pressure duct 142 will decrease and check valve 144 will open to allow refrigerant from suction pipe 88 to directly enter into intermediate pressure duct 142 so as to be guided to intermediate pressure inlet 138 of second stage 132 which in any case compresses refrigerant and discharges compressed refrigerant through high pressure outlet 146 which is connected to compressor discharge 64.

Therefore, compressor 60 can be operated in a first mode, in which solenoid valve 134 is closed and only second stage 132 is operative or in a second mode in which both stages 130 and 132 are operative.

To defrost evaporator 30, controller 90 is adapted to control heating of evaporator 30 within time intervals which can be determined. Heating can be switched off when a preset temperature at temperature sensor 94 is detected, because then it can be assumed that evaporator 30 is completely defrosted.

For heating of evaporator 30 a hot gas pipe 152 with a hot gas valve 154 provided therein is connecting inlet part 82 of evaporator 30 with discharge pipe 62 and for a bypass for condenser 50 and electronic thermo valve 80. Hot gas valve 154 is controlled by controller 90.

In addition or alternatively evaporator 30 can be heated by heating elements 150 which can be controlled by controller 90.

Heating of evaporator 30 is performed in the same manner as when heating is demanded in normal operating mode.

In addition, water cooled condenser 74 can be activated or deactivated by controller 90. When water cooled condenser 71 is not activated air cooled condenser 50 is cooled by condenser fan 54 which can be operated at various speeds. The actual speed of condenser fan 54 is controlled in accordance with the actual pressure detected by high pressure transducer 104.

If water cooled condenser 71 is activated by controller 90 condenser fan 54 is switched off.

The cooling unit according to the present invention is operated as follows:

Closed cooling unit 70 can be operated in various stages according to the cooling or heating power demanded at evaporator 30 for maintaining a defined temperature level within transport volume 16.

If a cooling or heating power between level A and a level-A is demanded at evaporator 30, closed cooling circuit 70 will be operated in operational stage 0.

In stage 0 compressor 60 is operated in the first mode, e.g. with first stage 130 switched off. Further in stage 0 closed cooling circuit 70 provides the lowest possible compressor speed related cooling capacity which can be defined to be a first compressor speed mode.

Further in stage 0 compressor 60 is running at a minimum speed level which is indicated by an (a).

For controlling the cooling power hot gas valve 154 will be switched on and off by controller 90, using pulse width modulation for operating said hot gas valve 154 wherein compressor 60 will run at minimum speed level (a).

Even though hot gas valve 154 is switched "on" and "off" after certain time intervals the precision of the temperature control within cargo volume 16 is still high due to the sufficiently high thermal inertia of the entire system and due to the low cooling power required.

Changing the pulse width between "on" and "off" of hot gas valve 154 corresponds to "by-passing" or "not by-passing" of condensor 50 and electronic thermo valve 80 with the consequence that condensor 50 is in an inoperable mode or an operable mode.

In the inoperable mode of condensor 50 cooling circuit 70 does not produce cooling power at evaporator 30 but produces heating power at evaporator 30.

Only in the operable mode of condenser 50 cooling circuit 70 produces cooling power.

By switching between inoperable mode of condensor 50 and the operable mode of condenser 50 the cooling power can be varied depending on the relative duration of the operable mode interval in relation to the duration of the inoperable mode interval.

If the durations of the mode intervals are equal with respect to net heating power and net cooling power generated the resulting cooling power is zero. If the duration of the mode interval of the operable mode exceeds the duration of the mode interval of the inoperable mode the cooling power of cooling circuit 70 is positive.

If the duration of the mode interval of the inoperable mode exceeds the duration of the mode interval of the operable mode the cooling power of cooling circuit 70 is negative e.g. cooling circuit 70 has a heating power.

Closed cooling circuit 70 can further be operated at operational stage 1 which extends between level (A) of the cooling power and level (B).

In this stage closed cooling circuit 70 is still operated with the first compressor speed mode which is identical to the compressor speed mode in operational stage 0.

However, in operational stage 1 hot gas valve 154 is closed and the cooling power provided at evaporator 30 will be controlled by controlling the speed of compressor 60.

A transition between operational stage 0 and operational stage 1 can be easily achieved by terminating the pulse width modulated operation of hot gas valve 154 and keeping compressor 60 running so that due to the first compressor speed related cooling capacity cooling power according to level (A) is provided at evaporator 30. If a higher cooling power is required at evaporator 30 the speed of compressor 60 can be altered until value (b) which corresponds to level (B) of the cooling power when operating closed cooling circuit 70 with the first compressor speed mode.

Figure 5:
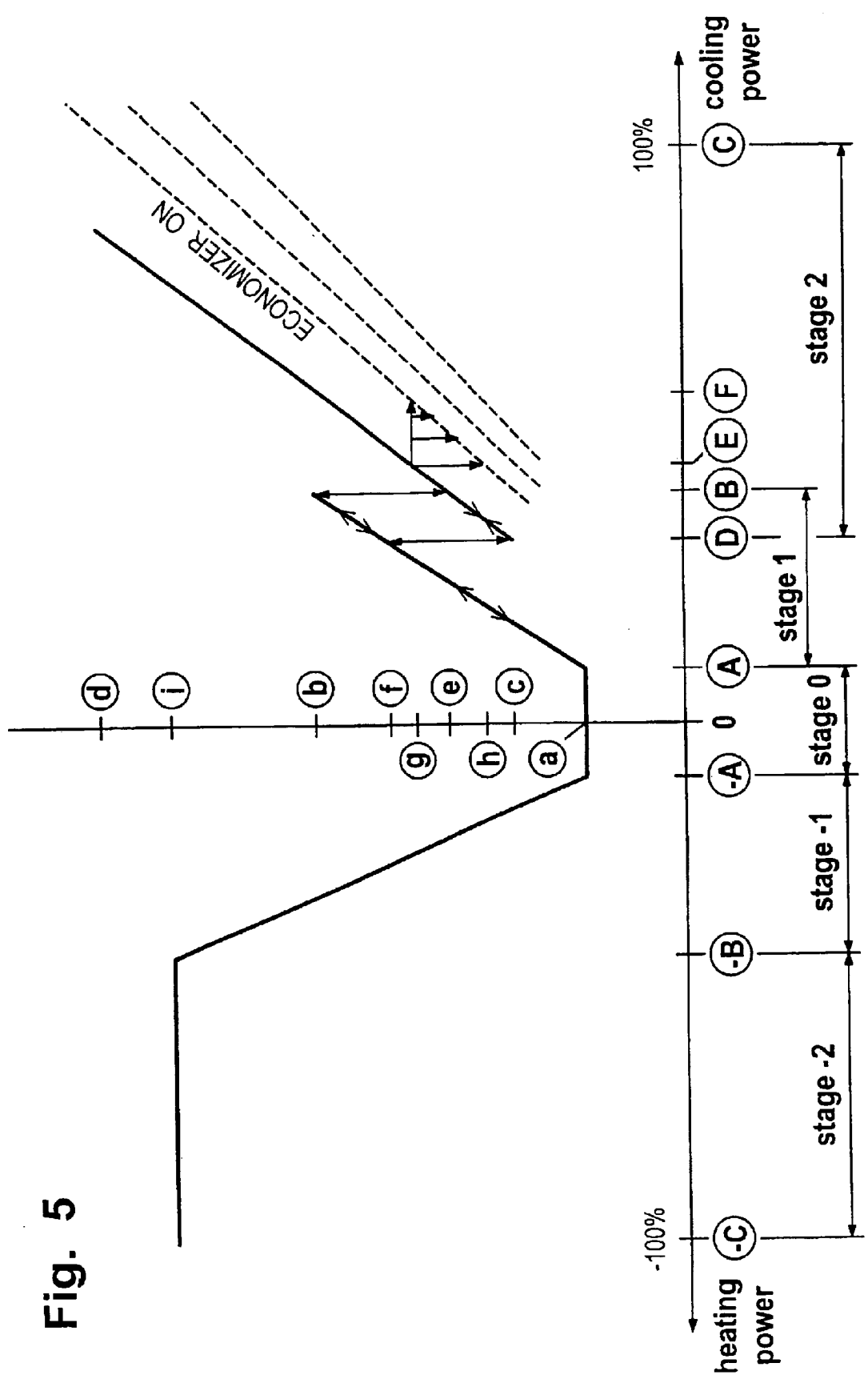
FIG. 5 shows a schematic representation of the relationship between cooling capacity and speed of the compressor in various stages of operation.

Controller 90 is further adapted to operate closed cooling circuit 70 in operational stage 2 as indicated in FIG. 5.

Operational stage 2 extends from a maximum cooling power corresponding to level (C) to a cooling power corresponding to level (D).

In stage 2 compressor 60 is operated in its second mode in which its first stage 130 and its second stage 132 are operable so that compressor 60 operates as a two stage compressor.

Due to the fact that compressor 60 is now operating in its second mode, e.g. as a two stage compressor, the compressor speed related cooling capacity of closed cooling circuit 70 is higher than when compressor 60 is only operated with its first mode so that in operational stage 2 closed cooling circuit 70 is operated with a second compressor speed related cooling capacity.

For controlling the cooling power provided at evaporator 30 controller 90 controls the speed of compressor 60 between its minimum speed which corresponds to level (c) to the maximum possible speed in operational stage 2 which corresponds to level (d).

A transition between operational stage 1 and operational stage 2 can be carried out only with a certain hysteresis for avoiding rapid switching back and forth of controller 90 between operational stage 1 and operational stage 2.

To obtain such a hysteresis, closed cooling circuit 70 will be operated in operational stage 1 until level (B) of the cooling power and when level (B) is achieved compressor 60 will be switched from its first mode to its second mode and consequently closed cooling circuit 70 will be operated with the second compressor speed related cooling capacity so that the speed of compressor 60 has to be reduced from level (b) to level (e) if only cooling power of level (B) is demanded.

If, however, closed cooling circuit is operated in operational stage 2 and cooling power of level (B) is demanded at evaporator 30 closed cooling circuit 70 will remain at operational stage 2. Even if the demanded cooling power is reduced closed cooling circuit 70 will remain in operational stage 2 until a level (D) of the cooling power which is below level (B).

If the demanded cooling power is lowered to level (D) compressor 60 will be switched from its second mode used in operational stage 2 to its first mode used in operational stage 1. Since the first compressor speed related cooling capacity is lower than the second compressor speed related cooling capacity the speed level of compressor 60 which is (c) at level (D) of the cooling power has to be increased up to level (f).

Controller 90 can further operate electronic thermo valve 108 in closed cooling circuit 70, which controls the flow of refrigerant to the economizer 77. Electronic thermo valve 108 is activated if the temperature of compressor 60 exceeds a predetermined temperatur. Evaporated refrigerant will pass through economizer 70 and provide cooling of compressor 60.

Due to the fact that economizer 77 is able to further increase the compressor speed related cooling capacity of closed cooling circuit 70 in operational stage 2, closed cooling circuit 70 will have a further compressor speed related cooling capacity which is the highest available compressor speed related cooling capacity.

After opening of electronic thermo valve 108 a so-called "economizer fade in" takes place, which means that economizer 77 starts to affect the compressor speed related cooling capacity and the "economizer fade in" is terminated if economizer 77 is fully operable. During this "economizer fade in" controller 90 will adapt the speed of compressor 60 in response to the cooling power provided at evaporator 30 and in response to cooling power demanded. If, for example, a cooling power at a level corresponding to level (E) is required, controller 90 will reduce the speed of compressor 60 starting at speed level (g) according to the increasing effect of economizer 77 on the compressor speed related cooling capacity to speed level (h).

If, however, during "economizer fade in" the cooling power demanded at evaporator 30 is between level (E) and level (F) controller 90 will reduce the speed of compressor 60 to a lesser extent so that at the end of the "economizer fade in" closed cooling circuit 70 will provide the respective cooling power.

If during "economizer fade in" the cooling power demanded at evaporator 30 reaches level (F) the speed of compressor 60 will not increase but due to the increasing effect of economizer 77 on the compressor speed related cooling capacity level (F) of the cooling power will be achieved after a certain interval of time at a compressor speed at level (g) which corresponds to the cooling power at level (E) in operational stage 2.

Closed cooling circuit 70 can further be operated at operational heating stage-1 which extends between level (-A) of the heating power and level (-B).

In this stage closed cooling circuit 70 is operated with the first compressor speed mode which is identical to the compressor speed mode in operational stage 0.

However, in operational stage-1 hot gas valve 154 is fully open and the heating power provided at evaporator 30 will be controlled by controlling the speed of compressor 60.

A transition between operational stage 0 and operational stage-1 can be easily achieved by keeping the hot gas valve 154 open and keeping the compressor 60 running so that due to the first compressor speed mode heating power according to level (-A) is provided at evaporator 30. If a higher heating power is required at evaporator 30 the speed of compressor 60 can be altered until value (i) which corresponds to level (-B) of the heating power when operating closed circuit 70 with the first compressor speed mode.

Controller 90 is further adapted to operate closed cooling circuit 70 in operational stage-2 as indicated in FIG. 5.

Operational stage-2 extends from a heating power corresponding to level (-B) to a heating power corresponding to level (-C).

In this stage closed cooling circuit 70 is operated with the first compressor speed mode which is identical to the compressor speed mode in operational stage 0 and stage 1.

For controlling the heating power provided at evaporator 30 controller 90 runs the closed cooling circuit 70 corresponding to heating capacity (-B) and switching the electrical heaters 150 on and off using a pulse width modulating mode so as to obtain additional heating capacity.

As an example for the purpose of illustration a start-up of a transportable cooling unit according to the present invention will be performed by controller 90 as follows:

As shown in FIG. 5 if the cooling unit is switched on compressor 60 starts running at minimum speed as indicated at level (a) in FIG. 5. In addition, evaporator fans 20 start running.

If the cooling power demanded at evaporator 30 is in the region between level (A) and level (-A) the cooling unit is operated in operational stage 0 in which compressor 60 runs at minimum speed at level (a) and the cooling power or heating power required is adjusted by controlling hot gas valve 154 to obtain appropriate duration of the mode intervals.

If the cooling power required at evaporator 30 exceeds level (A) compressor 60 is operated in operational stage 1 and controller 90 will control the cooling capacity only by controlling the speed at which compressor 60 is operated.

Closed cooling circuit 70 is maintained within operational stage 1 until a cooling power at level (B) or higher is required. If a cooling power at level (B) or higher is demanded controller 90 switches closed cooling circuit 70 from operational stage 1 to operational stage 2. In the second mode the cooling capacity of closed cooling circuit 70 is increased and for this reason the speed at which compressor 60 is driven has to be decreased. This enables a higher cooling capacity to be obtained at even lower speed of compressor 60 so that even higher cooling capacity can be obtained if the speed of compressor 60 is increased again. In operational stage 2 of closed cooling circuit 70 the cooling power can be controlled by controlling the speed of compressor 60.

The cooling requirement within cargo volume 16 can be detected in various ways.

In a so-called chilled mode, in which the temperature within cargo volume 16 is above −10° Celsius controller 90 is operated in the chilled mode program and in the chilled mode program controller 90 detects the temperature within cargo volume 16 by means of the supply air sensors 96 which detect the temperature within supply air stream 23.

In the chilled mode program the evaporator fans 20 are also operated at maximum speed for obtaining very small deviations from the desired temperature level. These deviations are in the range of +/−0,25° Celsius.

In another case, a so-called frozen mode, the temperature within the cargo volume 16 is below −10° Celsius and in this case controller 90 is in the frozen mode program, in which the temperature within cargo volume 16 is detected by temperature sensor 92 detecting the temperature within return air stream 22 before reaching evaporator 30.

In this case, evaporator fan 20 is operated at a speed below its highest speed, a so-called low speed level because the tolerances from the desired temperature can be higher. In case of the frozen mode the tolerances can be of about +/−1° Celsius.

What is claimed is:

1. Transportable cooling unit for maintaining a transport volume at a defined temperature, comprising:
   a closed cooling circuit serially including a multi-stage compressor, a condensor, an expansion device and an evaporator arranged in said transport volume,
   a speed controlled electric motor driving said compressor, and
   a controller sensing a temperature present within said transport volume and controlling said electric motor so as to provide heating or cooling power demanded at said evaporator for maintaining said defined temperature and minimizing energy consumption, said controller operating said closed cooling circuit between a maximum possible heating power and a maximum possible cooling power in a sequence of different operational stages comprising a lowest operational stage and a sequence of at least two upper operational cooling stages,
   said controller operating said closed cooling circuit in each one of said upper operational cooling stages at a compressor speed related cooling capacity different from said compressor speed related cooling capacity in said other upper operational cooling stages,
   within said respective upper operational cooling stages said controller operating said electric motor in an uninterrupted mode and adjusting said cooling power provided by said closed cooling circuit by an essentially stepless speed control of said electric motor,
   said heating power is obtained in addition to cooling power by providing an inoperable mode of said condenser in addition to an operable mode of said condenser, and
   said controller operates said compressor in said lowest operational stage in an uninterrupted mode at low speed and operates said closed cooling circuit by changing between the operable and inoperable mode of said condenser according to respective mode intervals and adjusts said cooling or heating power by adjusting at least one of the parameters comprising speed of said compressor and duration of said mode intervals.

2. Cooling unit according to claim 1, wherein said speed controllable electric motor is a frequency controlled AC-motor.

3. Cooling unit according to claim 1, wherein said inoperable mode of said condenser provides bypassing said condenser.

4. Cooling unit according to claim 3, wherein said inoperable mode of said condenser also provides by-passing of said expansion device.

5. Cooling unit according to claim 3, wherein a by-pass pipe is provided and wherein a valve is provided which enables changes between the operable mode of said condenser combined with an inoperable bypass pipe and the inoperable mode of said condenser combined with an operable bypass pipe.

6. Cooling unit according to claim 1, wherein said controller in said lowest operational stage maintains said speed of said electric motor essentially constant and varies the duration of said mode intervals.

7. Cooling unit according to claim 6, wherein in said lowest operational stage said constant speed of said electric motor is in the dimension of the minimum possible speed of said compressor.

8. Cooling unit according to claim 1, wherein said mode intervals are generated by controlling a hot gas valve in said bypass pipe to said condenser.

9. Cooling unit according to claim 1, wherein said controller defines the cooling power demanded by comparing the temperature present within said transport volume and the requested temperature in said transport volume.

10. Cooling unit according to claim 1, wherein said controller senses the temperature in a stream of air circulating within said transport volume.

11. Cooling unit according to claim 10, wherein said controller senses the temperature within said transport volume close to said evaporator.

12. Cooling unit according to claim 1, wherein said controller selects the currently necessary operational cooling stage in accordance with the cooling power demanded and adjusts the speed of the compressor for precise adjustment of the cooling power provided by said closed cooling circuit.

13. Cooling unit according to claim 1, wherein said compressor speed related cooling capacity of said closed cooling circuit with the condenser being in the operable mode is constant within said lowest operational stage.

14. Cooling unit according to claim 1, wherein said compressor speed related cooling capacity of said closed cooling circuit with the condenser being in the operable mode is constant within at least one of said upper operational cooling stages.

15. Cooling unit according to claim 1, wherein said compressor speed related cooling capacity of said closed cooling circuit in said lowest stage with the condenser being in said operable mode is the same as the compressor speed related cooling capacity in said one of said upper operational cooling stages covering the lowest range of cooling power of said sequence of upper operational stages.

16. Cooling unit according to claim 1, wherein the controller switches from one upper operational stage cooling to another upper operational cooling stage with a hysteresis with respect to the level of cooling power.

17. Cooling unit according to claim 16, wherein in the course of a transition from one of said upper operational cooling stages to another of said upper operational cooling stages said controller maintains full control of the cooling power provided by said closed cooling circuit by adjusting the speed of said compressor in accordance with the change of the compressor speed related cooling capacity.

18. Cooling unit according to claim 1, wherein said multi-stage compressor is operable in a first mode using a reduced number of compressor stages or in a second mode using all compressor stages.

19. Cooling unit according to claim 18, wherein said multi-stage compressor is controllable by said controller so as to be operated in said first mode or in said second mode.

20. Cooling unit according to claim 19, wherein in one of said upper operational cooling stages of said closed cooling circuit said compressor operates in said first mode and in another of said upper operational cooling stages of said closed cooling circuit said compressor operates in said second mode.

21. Cooling unit according to claim 20, wherein said controller switches from an operational cooling stage in which the compressor operates in said first mode to the operational cooling stage in which the compressor operates in said second mode at a defined level of cooling power which is higher than the defined level of cooling power at which the controller switches from the operational cooling stage in which the compressor operates in said second mode to the operational cooling stage in which the compressor operates in said first mode.

22. Cooling unit according to claim 1, wherein an economizer is provided in said closed cooling circuit.

23. Cooling unit according to claim 22, wherein said economizer can be switched by said controller between an economizer on-mode and an economizer off-mode.

24. Cooling unit according to claim 23, wherein in at least one of said upper operational stages the closed cooling circuit is controlled to operate in an economizer off-mode or in an economizer on-mode.

25. Cooling unit according to claim 24, wherein said controller in said operational stage in which the closed cooling circuit can be operated in the economizer off-mode or in the economizer on-mode switches from the economizer off-mode to the economizer on-mode if the temperature of compressor exceeds a defined level.

26. Transportable cooling unit for maintaining a transport volume at a defined temperature, comprising:

a closed cooling circuit serially including a multi-stage compressor, a condensor, an expansion device and an evaporator arranged in said transport volume, a speed controlled electric motor driving said compressor, and a controller sensing a temperature present within said transport volume and controlling said electric motor so as to provide heating or cooling power demanded at said evaporator for maintaining said defined temperature and minimizing energy consumption, said controller operating said closed cooling circuit between a maximum possible heating power and a maximum possible cooling power in a sequence of different operational stages comprising a lowest operational stage and a sequence of at least two upper operational cooling stages, said controller operating said closed cooling circuit in each one of said upper operational cooling stages at a compressor speed related cooling capacity different from said compressor speed related cooling capacity in said other upper operational cooling stages, within said respective upper operational cooling stages said controller operating said electric motor in an uninterrupted mode and adjusting said cooling power provided by said closed cooling circuit by an essentially stepless speed control of said electric motor, an upper operational heating stage is provided, and within said upper operational heating stage said controller is operating said electric motor in an uninterrupted mode and adjusting said heating power provided by said closed cooling circuit by an essentially stepless speed control of said electric motor.

27. Cooling unit according to claim 26, wherein said compressor speed related heating capacity of said closed cooling circuit is constant within said upper operational heating stage.

28. Cooling unit according to claim 26, wherein a further upper operational heating stage is provided in which the heating power of said cooling circuit is increased by a heating device.

29. Refrigerated container comprising:

a thermally insulated housing enclosing a transport volume to be cooled, a cooling unit for maintaining said transport volume at a defined temperature, said cooling unit comprising a closed cooling circuit serially including a multi-stage compressor, a condenser, an expansion device and an evaporator arranged in said transport volume, a speed controlled electric motor driving said compressor, and a controller sensing a temperature present within said transport volume and controlling said electric motor so as to provide heating or cooling power demanded at said evaporator for maintaining said defined temperature and minimizing energy consumption, said controller operating said closed cooling circuit between a maximum possible heating power and a maximum possible cooling power in a sequence of different operational stages comprising a lowest operational stage and a sequence of at least two upper operational cooling stages, said controller operating said closed cooling circuit in each one of said upper operational cooling stages at a compressor speed related cooling capacity different from said compressor speed related cooling capacity in said other upper operational cooling stages, within said respective upper operational cooling stages said controller operating said electric motor in an uninterrupted mode and adjusting said cooling power provided by said closed cooling circuit by an essentially stepless speed control of said electric motor, said heating power is obtained in addition to cooling power by providing an inoperable mode of said condenser in addition to an operable mode of said condenser, and said controller operates said compressor in said lowest operational stage in an uninterrupted mode at low speed and operates said closed cooling circuit by changing between the operable and inoperable mode of said condenser according to respective mode intervals and adjusts said cooling or heating power by adjusting at least one of the parameters comprising speed of said compressor and duration of said mode intervals.

30. Refrigerated container comprising:

a thermally insulated housing enclosing a transport volume to be cooled, a cooling unit for maintaining said transport volume at a defined temperature, said cooling unit comprising a closed cooling circuit serially including a multi-stage compressor, a condenser, an expansion device and an evaporator arranged in said transport volume, a speed controlled electric motor driving said compressor, and a controller sensing a temperature present within said transport volume and controlling said electric motor so as to provide heating or cooling power demanded at said evaporator for maintaining said defined temperature and minimizing energy consumption, said controller operating said closed cooling circuit between a maximum possible heating power and a maximum possible cooling power in a sequence of different operational stages comprising a lowest operational stage and a sequence of at least two upper operational cooling stages, said controller operating said closed cooling circuit in each one of said upper operational cooling stages at a compressor speed related cooling capacity different from said compressor speed related cooling capacity in said other upper operational cooling stages, within said respective upper operational cooling stages said controller operating said electric motor in an uninterrupted mode and adjusting said cooling power provided by said closed cooling circuit by an essentially stepless speed control of said electric motor, an upper operational heating stage is provided, and within said upper operational heating stage said controller is operating said electric motor in an uninterrupted mode and adjusting said heating power provided by said closed cooling circuit by an essentially stepless speed control of said electric motor.

31. Transportable cooling unit for maintaining a transport volume at a defined temperature, comprising:

a closed cooling circuit serially including a multi-stage compressor, a condenser, an expansion device and an evaporator arranged in said transport volume, a speed controlled electric motor driving said compressor, and a controller sensing a temperature present within said transport volume and controlling said electric motor so as to provide heating or cooling power demanded at said evaporator for maintaining said defined temperature and minimizing energy consumption, said controller operating said closed cooling circuit between a maximum possible heating power and a maximum possible cooling power in a sequence of different operational stages comprising a lowest operational stage and a sequence of at least two upper operational cooling stages, said controller operating said closed cooling circuit in each one of said upper operational cooling stages at a compressor speed related cooling capacity different from said compressor speed related cooling capacity in said other upper operational cooling stages, within said respective upper operational cooling stages said controller operating said electric motor in an uninterrupted mode and adjusting said cooling power provided by said closed cooling circuit by an essentially stepless speed control of said electric motor, at least for defrosting, said heating power is obtained in addition to cooling power by providing an inoperable mode of said condenser in addition to an operable mode of said condenser, and said controller operates said compressor in said lowest operational stage in an uninterrupted mode at low speed and operates said closed cooling circuit by changing between the operable and inoperable mode of said condenser according to respective mode intervals and adjusts said cooling or heating power by adjusting at least one of the parameters comprising speed of said compressor and duration of said mode intervals.

32. Transportable cooling unit for maintaining a transport volume at a defined temperature, comprising:

a closed cooling circuit serially including a multi-stage compressor, a condensor, an expansion device and an evaporator arranged in said transport volume, a speed controlled electric motor driving said compressor, and a controller sensing a temperature present within said transport volume and controlling said electric motor so as to provide heating or cooling power demanded at said evaporator for maintaining said defined temperature and minimizing energy consumption, said controller operating said closed cooling circuit between a maximum possible heating power and a maximum possible cooling power in a sequence of different operational stages comprising a lowest operational stage and a sequence of at least two upper operational cooling stages, said controller operating said closed cooling circuit in each one of said upper operational cooling stages at a compressor speed related cooling capacity different from said compressor speed related cooling capacity in said other upper operational cooling stages, within said respective upper operational cooling stages said controller operating said electric motor in an uninterrupted mode and adjusting said cooling power provided by said closed cooling circuit by an essentially stepless speed control of said electric motor, and at least for defrosting, an upper operational heating stage is provided, and within said upper operational heating stage said controller is operating said electric motor in an uninterrupted mode and adjusting said heating power provided by said closed cooling circuit by an essentially stepless speed control of said electric motor.

* * * * *